United States Patent
Tatro

(10) Patent No.: US 7,739,050 B2
(45) Date of Patent: Jun. 15, 2010

(54) SOFTWARE-BASED QUALITY CONTROL ANALYSIS OF WELL LOG DATA

(75) Inventor: Matthew N. Tatro, Rio de Janeiro (BR)

(73) Assignee: Landmark Graphics Corporation, Houston, TX (US)

( * ) Notice: Subject to any disclaimer, the term of this patent is extended or adjusted under 35 U.S.C. 154(b) by 258 days.

(21) Appl. No.: 11/770,184

(22) Filed: Jun. 28, 2007

(65) Prior Publication Data

US 2008/0133137 A1   Jun. 5, 2008

Related U.S. Application Data

(60) Provisional application No. 60/868,556, filed on Dec. 5, 2006.

(51) Int. Cl.
*G06F 19/00* (2006.01)
(52) U.S. Cl. .......................................................... 702/6
(58) Field of Classification Search ....................... 702/6
See application file for complete search history.

(56) References Cited

U.S. PATENT DOCUMENTS 6,305,148 B1 * 10/2001 Bowden et al. ............... 53/432
2004/0254919 A1 * 12/2004 Giuseppini ..................... 707/3

FOREIGN PATENT DOCUMENTS

KR   10-2003-0022938 A   3/2003

OTHER PUBLICATIONS http://www.oilware.com/dataconv.htm, Apr. 13, 2010, p. 1.*
PCT International Search Report and Written Opinion, International Application No. PCT/US2007/085778; International Filing Date Nov. 20, 2007, dated Apr. 18, 2008, 10 pp.

* cited by examiner

*Primary Examiner*—Tung S Lau
(74) *Attorney, Agent, or Firm*—Mark E. Scott; Conley Rose, P.C.

(57) ABSTRACT

Software-based quality control analysis of well log data. At least some of the various embodiments are computer-readable mediums storing a program that, when executed by a processor, causes the processor to read data from a well log, and perform a quality control analysis on the data.

18 Claims, 1 Drawing Sheet

SOFTWARE-BASED QUALITY CONTROL ANALYSIS OF WELL LOG DATA

CROSS-REFERENCE TO RELATED APPLICATIONS

This application claims the benefit of Provisional Application Ser. No. 60/868,556 filed Dec. 5, 2006, titled "Performing Quality Control on a Well Log," and incorporated by reference herein as if reproduced in full below.

BACKGROUND

During the life of a hydrocarbon producing well (e.g., oil well or natural gas well), the well may be the subject of multiple "logging" operations. Well logging may take place while drilling, during the drilling process but with the drill string removed, or after the well is completed and has a casing installed. After each logging operation, the one or more logs produced are reviewed by a human analyst. In particular, the analyst reviews the header data, and may also compare information in the header data to the actual log data. Such a review is known as performing quality control on the well. Performing human-based quality control analysis of the log header data is very time consuming as in most logs the header data may comprise 350 or more data points. In some cases, the human-based interpretation and/or comparison of the well header information may take from two to four man-days to complete for each well.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments of the invention were developed in the context of performing quality control on log data associated with a hydrocarbon producing well, and will therefore be described in that manner; however, the underlying concepts are not limited to just performing quality control on log data, and are equally applicable to other fields of endeavor, for example performing quality control on multiple three dimensional seismic data sets (known as "4D" seismic).

Figure 1:
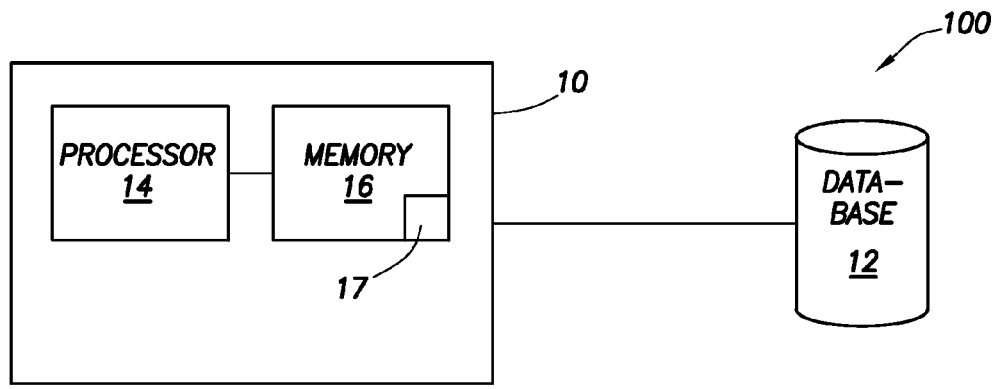
FIG. 1 shows a system in accordance with at least some embodiments.

FIG. 1 shows a system 100 in accordance with at least some embodiments. In particular, the system 100 comprises a computer system 10 and a database 12 of well information. The computer system 10 comprises a processor 14 coupled to a memory 16. The processor 14 is any currently available, or after-developed, processor capable of executing programs. The memory 16 may take many forms. In some embodiments the memory 16 is random access memory (RAM) that forms the working memory for the processor 14. In other embodiments, the memory 16 is long term non-volatile storage, such as flash RAM, battery backed RAM or hard drive. In yet still other embodiments, the memory 16 may be a combination of these.

The database 12, while shown external to the computer system 10, may physically reside within the computer system 10 (e.g., within the memory 16), or within another computer system at some physical distance from the computer system 10. For example, the computer system 10 may couple to the database 12 through an Internet connection, and thus the computer system 10 and database 12 may reside many thousands of miles apart. The database 12 may have multiple aspects. In some embodiments, the database 12 contains information regarding a particular hydrocarbon producing well. For example, the database 12 stores data associated with at least some, if not all, the logging operations performed on the particular hydrocarbon producing well. Well log data stored in database 12 may be stored in a variety of forms. For example, the well log data may be in Log Information Standard (LIS), digital LIS (DLIS), log ASCII standard (LAS). However, while such standards are useful for storing and possibly viewing well log data, these standards are not well suited for software-based analysis of the well log data.

In other embodiments, the database 12 may be the repository of results of conversion of the illustrative LIS-, DLIS- or LAS-based well log data to a second file format, such as extensible markup language (XML) (discussed below), and may also hold results of software-based quality control analysis. In yet still other embodiments, the database 12 holds the LIS-, DLIS- or LAS-based well data and the illustrative XML-based data and corresponding quality control analysis results.

A particular well log may be logically divided into two parts: header data; and log values. The header data contains information about the well itself or data about the particular logging run to which the associated log data applies. For example, the header data may comprise information such as: the name of the well operator; the name of the company that performed the well logging operation; the geographic coordinates of the well; units of measure for data within the log data portion of the well log; the top elevation where the log data begins; the bottom elevation where the log data begins; whether oil-based drilling mud was used in drilling the well; or the name of the well to which the well log applies. This list is merely illustrative, as there may be 350 or more data points within the header data. The log values are the values read during the logging procedure (e.g., case bond impedance as function of depth, resistivity of the formation surrounding the borehole as a function of depth, porosity of the formation surrounding the borehole as a function of depth).

In accordance with the various embodiments, at least a portion of the well log data is converted from its native file format or standard to a standard more suitable for viewing, access and manipulation by computer program. In particular, at least the header data is converted (but in some cases the log values are converted as well) from its native standard to XML, although any currently available or after-developed standard suitable for computer reading and writing may be equivalently used. XML is relatively easy for a computer program to read and manipulate, and allows information to be stored in text-based files in a tree-structure.

Once the well log data is converted to the illustrative XML format, the computer system performs a quality control analysis on at least the header data. The analysis may take many forms. In some cases, the computer program performs quality control analysis within the header of a single set of well log data (i.e., that corresponding to a single well log). For example, the processor 14 executing a program read from a computer-readable storage medium (e.g., memory 16) may: check for the presence of the name of the well operator; check for the presence of the name of the company that performed the logging operation; check whether the geographic coordinates of the well are present and in proper form; check whether units of measure for data within the log data portion of the well log are in the proper format; check whether the top elevation where the log data begins indicated in the header data corresponds to that of the log data; check whether the bottom elevation where the log data ends indicated in the header data corresponds to that of the log data; check whether there is an indication of whether oil-based drilling mud was used in drilling the well; or check that the assigned name of the well to which the well log applies is present. This list is merely illustrative, as there may be 350 or more data points within the header data, any or all of which may be checked in some form in the quality control process. In other embodiments, the computer system may compare data as between sets of well log data, possible well log data on which the quality control process was previously performed.

Regardless of the precise type of quality control evaluation performed, in at least some embodiments the computer system 10 is informed about the checks to be performed by way of a rules file, such as a rules file 17 stored in the memory 16. In particular, in addition to being provided access singly or to various sets of well log data on which to perform quality control analysis, the computer system is also provided a file which contains a list checks to be performed, such as those illustrative checks discussed above. In some embodiments the rules file is coded in XML, but any currently available or after developed coding language may be equivalently used. The computer system 10 performs the quality control analysis based, at least in part, on rules in the rules file.

If the quality control analysis reveals any shortcomings, an error report may be produced which identifies the shortcomings. In some embodiments, the computer system 10 may note the error and correct the error if possible (e.g., modify date to correct format). If no errors are found, if the errors found are corrected, the well log data under quality control scrutiny may then be supplied to the client, or uploaded to the client's database. Reporting errors to the client can be selectively adapted to take the form specifically desired by the client, and varied from client to client. For example, in some embodiments report templates are coded in XML to meet the customer's specific error reporting requirements; however, any currently available or after-developed coding system may be equivalently used. The report templates are then populated with the requested data, and supplied to the client. Performing quality control on the well log data as described herein can reduce the time to perform quality control analysis from two to four man days as described in the Background section to one man-hour, or less in some circumstances.

Figure 2:
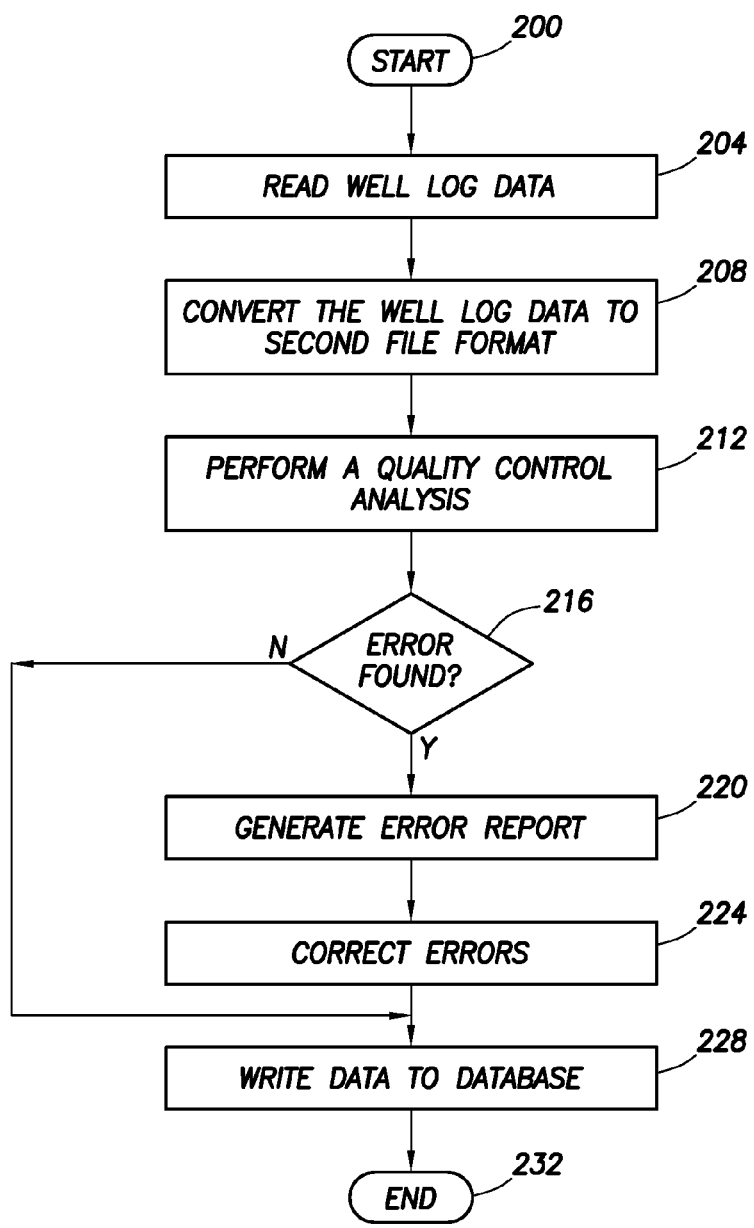
FIG. 2 shows a method (e.g., software) in accordance with at least some embodiments.

FIG. 2 shows a method in accordance with at least some embodiments. In particular the method starts (block 200) and proceeds to reading well log data (block 204). Reading the well log data may take many forms. In some embodiments, the well log is provided to the computer system by way of a portable storage device, such as from a compact disc (CD) or digital video disk (DVD) read only memory (ROM). In other embodiments the well log may be read from a database. Reading of the well log data may be from any of a variety of file formats. For example, reading the well log may involve reading in file formats such as LIS, DLIS or LAS. Thus, in some embodiments at least the header data portion of the well log data is converted to a second file format (block 208), such as an XML-based file format. In future implementations, when companies store data well log data directly in XML-based formats, the converting may be omitted.

After reading (again block 204) and possibly converting to XML (block 208), at least a portion of the data within the file is subjected to quality control analysis (block 212). In some embodiments, the particular quality control analysis performed is hard-coded in the program that performs the analysis. In yet other embodiments, the program that performs the quality control analysis accesses a rules files. The rules file (which in some embodiments is coded in XML) is a set of rules or tests to be performed on the header data and/or log values of the well log data.

Regardless of the precise mechanism by which quality control tests to be performed are conveyed to the program, if the well log data has errors or omissions (block 216), an error report may be generated (block 220). If no errors are found (again block 216), generating the error report may be omitted. In alternative embodiments, the computer system, if an error is identified, may correct the datum or data to which the error pertains.

In accordance with some embodiments, the conversion of the well log data to XML is only transitory, and once the quality control is completed the XML version may be deleted from the computer system. In alternative embodiments, the XML coded data may be retained and itself stored within a database (block 228), either with the native format data or in a separate database, and the process ends (block 232). In embodiments where the XML coded data is retained, the user may have the ability to query the database and generate statistics based on the data. Moreover, generating a screen-based display or paper well log from the XML coded data may be performed faster and easier than from the LIS, DLIS or LAS data, and thus retention of the converted well log data facilitates easier viewing.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable storage medium storing a program that, when executed by a processor, causes the processor to:
   read from a database well log data in a first file format standard;
   convert at least a portion of the well log data in the first file format standard to a second file format standard; and
   perform a quality control analysis on the data converted to the second file format standard.

2. The computer-readable storage medium as defined in claim 1 wherein when the processor reads the data in the first file format standard the program causes the processor to read data having one or more file formats selected from the group consisting of: Log ASCII Standard (LAS); Log Information Standard (LIS); or digital LIS (DLIS).

3. The computer-readable storage medium as defined in claim 1 wherein when the processor converts the data to a second file format standard, the program causes the processor to convert the data to extensible markup language (XML) format.

4. The computer-readable storage medium as defined in claim 1 wherein when the processor performs the quality control analysis, the program causes the processor to:
   access a rules file; and
   test whether the data is in conformance with rules from the rules file.

5. The computer-readable storage medium as defined in claim 1 wherein the program further causes the processor to generate an error report if shortcomings exist in the data.

6. The computer-readable storage medium as defined in claim 1 wherein the program further causes the processor to places values from the data in a database.

7. The computer-readable storage medium as defined in claim 1 wherein the program further causes the processor to correct at least one error identified in the data during the quality control analysis.

8. The computer-readable storage medium as defined in claim 4 wherein when the processor accesses the rules file, the program causes the processor to access the rules file coded in extensible markup language (XML) format.

9. The computer-readable storage medium as defined in claim 4 wherein when the processor tests whether the data is in conformance with rules from the rules file, the program causes the processor to one or more selected from the group consisting of: check whether the well operator is listed; check whether the company that performed the well log is listed; check whether the geographic coordinates of the well are listed; check whether the geographic coordinates of the well are in a prescribed format; check whether units of measure of data points are in a prescribed format; check for the presence of mandatory values; check whether an indication exists for use of oil-based drilling fluid; or check whether top and bottom depth values in header information correspond to top and bottom depth values in log data.

10. The computer-readable storage medium as defined in claim 6 wherein when the processor places values in the database, the program causes the processor to place header values and errors found in the quality control process in the database.

11. A computer system comprising:
    a processor; and
    a memory coupled to the processor;
    wherein the processor reads from a database well log data in a well log data file format standard;
    converts at least a portion of the well log data in the well log data file format standard to a markup language file format standard; and performs a quality control analysis on the well log data converted to the markup language the format standard.

12. The computer system as defined in claim 11 wherein when the processor reads the data in the well log data file format standard the processor reads data having one or more file formats selected from the group consisting of:
    Log ASCII Standard (LAS); Log Information Standard (LIS); or digital LIS (DLIS).

13. The computer system as defined in claim 11 wherein when the processor converts the data to the markup language file format standard, the processor converts the data to extensible markup language (XML) format.

14. The computer system as defined in claim 11 wherein when the processor performs the quality control analysis, the processor is further configured to:
    access a rules file; and
    test whether the data is in conformance with rules from the rules file.

15. The computer system as defined in claim 11 wherein the processor generates an error report if shortcomings exist in the data.

16. The computer system as defined in claim 11 wherein processor places values from the data in a database.

17. The computer system as defined in claim 11 wherein the processor corrects at least one error identified in the data during the quality control analysis.

18. The computer system as defined in claim 14 wherein when the processor accesses the rules file, the processor accesses the rules file coded in extensible markup language (XML) format.

* * * * *

UNITED STATES PATENT AND TRADEMARK OFFICE
CERTIFICATE OF CORRECTION

| | | |
|---|---|---|
| PATENT NO. | : 7,739,050 B2 | Page 1 of 1 |
| APPLICATION NO. | : 11/770184 | |
| DATED | : June 15, 2010 | |
| INVENTOR(S) | : Matthew N. Tatro | |

It is certified that error appears in the above-identified patent and that said Letters Patent is hereby corrected as shown below:

Column 6, lines 20-21, the phrase "markup language the format standard" should read --markup language file format standard--

Signed and Sealed this

Tenth Day of August, 2010

David J. Kappos
*Director of the United States Patent and Trademark Office*